United States Patent Office 2,799,559
Patented July 16, 1957

2,799,559

MANUFACTURE OF FLUOBORIC ACID

Thomas J. Sullivan, Princeton, Charles H. Milligan, Westfield, and James A. Gross, New Brunswick, N. J., assignors to The American Agricultural Chemical Company, New York, N. Y., a corporation of Delaware No Drawing. Application November 6, 1953, Serial No. 390,742

5 Claims. (Cl. 23—149)

This invention involves a process for the preparation of fluoboric acid, and particularly a convenient commercial form of the acid, i. e. in reasonably concentrated aqueous solution. Fluoboric acid is a known product which has numerous uses among which the following are mentioned purely by way of introduction. It may be employed, for instance, as a solvent for many metals. It is thus used to a considerable extent in plating baths, especially in plating which involves anodes that are difficult to dissolve. The acid may also be employed to make other compounds such as certain fluoborates which in themselves have many different uses. Tin fluoborate, for example, has found utility in tin plating operations, there being one such process in which both fluoboric acid and tin fluoborate are employed in the plating bath.

Not only is fluoboric acid well known as indicated above, but certain commercial processes have been employed or proposed for making it, usually from fluorspar. For example, certain of the known methods have involved, in addition to boric acid, the use of fluorspar and sulfuric acid; these procedures have presumably yielded a useful product, i. e. substantially uncontaminated by silicon compounds, even though certain reactions are in effect carried out in the presence of silica. Three different chemicals, however, are required and at least together represent a rather considerable expense, so that the known processes are quite costly. The process of this invention on the other hand is relatively inexpensive, and therefore has an important commercial advantage over the methods previously known.

The procedure of the present invention employs fluosilicic acid and boric acid. Fluosilicic acid is a substantially wasted by-product which is obtained, for instance, in the production of some agricultural chemicals, so that only one ordinary chemical of commerce, viz. boric acid, is required, the latter being a substance that is readily available and relatively inexpensive. Therefore, it is obvious that this invention involves a process which is more economical than any known process heretofore employed for producing fluoboric acid.

It has been known heretofore that fluosilicic acid and boric acid may be mixed to obtain a reaction. However, this reaction always produced a gel or amorphous material, e. g. a gelatinous mass of silica which filled the reaction vessel, and the separation of fluoboric acid from this gel has been impossible in any satisfactory manner, or at least entirely impractical from a commercial standpoint. We have now discovered that by mixing these two acids at elevated temperatures, a solid, non-gelatinous precipitate of silica (presumably in hydrated form, viz. $SiO_2 \cdot xH_2O$) is formed along with, i. e. within a solution of fluoboric acid and therefore a simple filtering step effectively separates the precipitated silica from the solution. In addition to fluoboric acid, however, the solution resulting from this mixing step usually also contains a minor proportion of fluosilicic acid and the remaining unreacted boric acid.

Our complete process generally involves two phases, the first phase being that of reacting these two components, fluosilicic acid and boric acid, to cause the reaction which produces fluoboric acid and a precipitate of silica. The second phase involves filtering and evaporating the reaction product so that a concentrated fluoboric acid is produced having a minimum of contaminating foreign substances. These two phases overlap somewhat and there may be two filtering steps involved for removing the precipitate of silica as will appear more fully below. The final concentrated fluoboric acid may be treated with some appropriate decolorizing agent, such as "Darco" or other activated charcoal or carbon, if color is objectionable in the ultimate product as it is to be used. If color is not objectionable, this treatment may be omitted. The equation of the reaction involved in our process is understood to be essentially as follows (omitting $H_2O$ as the third product of the stated reaction):

(1) 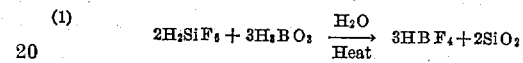

There are some critical aspects involved in our process or in its presently preferred operation and these aspects will now be pointed out. In the first phase involving the reaction of fluosilicic acid and boric acid at elevated temperature, we have found that a temperature of between 80° C. and 90° C. gives the best results. It is quite apparent that any higher temperature (for example, temperatures up to 100° C. to 105° C. without pressure) might be used. However, desired values in the solution tend to volatilize increasingly above 90° C. and, of course, at 100°–105° C. the boiling point will be reached. It appears that the temperature must be at least as high as 70° C. and, as just stated, the preferable range is from 80°–90° C. Tests have indicated that this temperature of at least about 70° C. is critical in order to produce a precipitate of silica, e. g. a granular, readily filtered precipitate, rather than a gel or gelatinous product.

The effect of temperature on the conversion of the fluosilicic acid to fluoboric acid seems to be quite slight, and the critical aspects of temperature, therefore, are only those in connection with the forming of a precipitate of silica, rather than a gel. The proportion of boric acid relative to fluosilicic acid seems to have some small effect, e. g. in that increasing concentrations of boric acid tend to expedite or increase the conversion, but within economic limits where a substantially pure fluoboric acid is desired, the effect does not seem to warrant the elimination of the second or evaporation phase or an attempt at performance of both phases in a single shorter step. That is, it appears that by using a large excess of boric acid, nearly all of the fluosilicic acid may be reacted to give fluoboric acid and precipitate of silica. The additional reagent cost, however, is not justified, especially since the product material must still be purified to meet most requirements. In consequence, it is preferable to operate with the boric acid at or near the stoichiometric amount (or sometimes even below), good economy being achieved with no more than a slight excess, i. e. about 2–5% over the stoichiometric quantity. In such case, the product of the first stage (of mixing at elevated temperature) is a solution which contains, in addition to unreacted boric acid, a concentration of about 10% of fluorine-containing acids which consist of approximately 85% fluoboric acid and 15% fluosilicic acid.

Another critical or important feature involved in the first phase of our process is the time or rate involved in adding one ingredient to the other. The mixing to cause a reaction of these two ingredients must be done slowly because, if a large quantity of one ingredient is dumped rapidly into a large quantity of the other (e. g. a solution of fluosilicic acid into a solution or slurry of boric acid, or vice versa), even though the required temperatures are being used, a gel or slimy suspension of silica may form. We prefer to use a period from one to two hours for completing the above-described mixing of the two ingredients. It appears that one hour is approximately the minimum amount of time since if less than this amount of time is employed in feeding one ingredient into the complete body of the other, the silica will become increasingly gelatinous. Of course, more than two hours could be used if not objectionable. After the first phase is completed, i. e. following the mixture of the two ingredients (fluosilicic acid and boric acid), a solution which is comprised of about 85% fluorboric acid and 15% fluosilicic acid with some precipitate of silica, will result.

In the second phase of our process, we prefer to use two steps, and some of the aspects and limitations of these steps will now be discussed. The first step involves a concentration of the fluoboric acid from a 10% solution to a 25%–30% solution. The second step involves the final concentration of the fluoboric acid to a solution of about 45% acid concentration. At the end of the first step, i. e. when a concentration of about 25%–30% acid solution is reached, the end of any substantial precipitation of silica has been reached also. Therefore, the solution may be filtered at this point, if desired. That is to say, as evaporation proceeds, a point is reached, usually at an acid concentration of 25% to 30%, where practically all precipitation of silica has ceased. Some silicon values usually still remain in solution, and are substantially eliminated by further evaporation. Such further removal of silicon values is understood to occur in the vapor state, presumably as silicon tetrafluoride, inasmuch as silica is found to deposit on cooler surfaces that the vapors pass upon leaving the reaction vessel. The change-over point at 25%–30% acid content is not a sharp demarcation, since there is some slight volatilization in the first step of evaporation and usually a little further precipitation of silica in the second step.

The use of at least two stages of evaporation is generally preferable, because a higher temperature is desirable in the second stage, while the lower temperature of the first evaporation stage tends to reduce volatilization losses and to promote maximum elimination of silica by precipitation. Although more than two stages can sometimes be used or alternatively a long single stage (e. g. preferably with some progressive increase of temperature), the two-step operation is particularly convenient, and is economical of time and desired chemical values; the first stage is therefore usually terminated at an acid concentration (i. e. fluorine-containing acid) of 25% to 30%. Such acid is then about 97% fluoboric and 3% fluosilicic. Filtration between stages can often be omitted, although removal of precipitated silica at such point may be convenient or economical in some cases. Various modes of evaporation may be employed, and the same type, or different types, can be used for successive stages. For instance, the first step can be effected with vacuum evaporation at 50° to 60° C., and the second step with submerged combustion at 80° to 90° C. (or higher).

The complete effect of the evaporation stages is especially important for the efficient production of fluoboric acid; reducing the water content of the mixture, i. e. by the application of heat, forces the reaction to continue to completion. Thus at the conclusion of the process, e. g. at the end of the second boil-down stage, the solution preferably has a concentration of about 45%–50% fluoboric acid, with little or no fluosilicic acid left. In other words, the final product of our process comprises an acid solution in which the fluorine-containing acid is 99% or more fluoboric and 1%, or more, usually much less, fluosilicic; indeed the fluosilicic acid can be brought down to a very small value. If concentration of the acid is carried beyond 45% or thereabout, any further decrease in silica is negligible and the decomposition of the fluoboric acid becomes quite high so that such additional concentration is not ordinarily warranted.

A specific description of a preferred embodiment of our process will now be set forth by way of example.

First of all, a 10% fluosilicic acid solution is added slowly (over an hour to two-hour period) to a hot slurry of boric acid (over 80° C.). We prefer to use about 2%–5% excess boric acid over the stoichiometric quantity. This mixing procedure may be reversed by taking a 10% fluosilicic acid solution and heating this solution to something over 80° C. Then boric acid crystals are added slowly (1–2 hours), using about 2%–5% excess boric acid as before.

In either case, following the mixture of these two ingredients, there results an acid solution containing 85% fluoboric acid, 15% fluosilicic acid, the unreacted boric acid, plus a granular, non gelatinous precipitate of silicon dioxide ($SiO_2$). The reaction equation involved is Equation 1 above.

Then, this acid solution may be filtered to remove the precipitate of silica. Although the filtering can be deferred to a later point in the process, it is very preferable to filter at the present point to avoid difficulty with too thick a mass in the evaporation steps.

Now, the solution is concentrated as by evaporation while keeping the temperature as low as possible. Although any feasible means of concentrating the solution may be employed, we prefer to use submerged combustion or vacuum evaporation, one example being the use of first one and then the other of these operations, in the respective steps of evaporation as explained above. The concentration is first continued until about 25%–30% acid concentration has been reached. The solution can be filtered to remove silica at this point, or for simplicity of operation, such filtration can be omitted, and separation of silica achieved by filtration or otherwise at the end of the complete process.

After the stage of 25%–30% concentration, the evaporation is continued (with increased heat, if desired) to a final extent. As pointed out above, we have found that a 45% to 50% acid concentration is usually the maximum which is economically warranted. During this final concentration step, there will be lost about 10% of the acid in vapors, and the percentage of fluosilicic acid in the solution with fluoboric acid will be reduced from 3% to 1%, or usually less. Much less silica will precipitate out during this second evaporation, however. All of the possible reduction in fluosilicic acid will have taken place at least by the end of this stage.

The product is a commercially suitable fluoboric acid, having good purity and produced with unusual economy as distinguished from prior procedures using fluorspar and sulfuric acid. A typical product of the present process is a colorless-watery solution analyzing boron 6.2% and fluorine 38.87%, the fluoboric acid concentration being 45.0%, and silica 0.25% (on 100% basis).

Although under suitable conditions it is possible to evaporate a fluoboric acid solution to a limit of about 70% concentration (at 28 inches of mercury), there is rather considerable loss in going much beyond 45% or 50%. Hence as a practical matter, the present process is to be regarded as particularly satisfactory in producing a reasonably concentrated solution of fluoboric acid having a very low percentage of foreign ingredients.

In the above example, the fluosilicic acid was employed in a concentration of about 10%, such being the average strength of acid available as a by-product in certain plants for treating mineral phosphate. The process of the invention, however, may be applied to fluosilicic acid of considerably less or considerably greater strength, such for example as acids up to 20% or more concentration.

We have described our invention in detail in accordance with the applicable statutes. However, it will now be apparent to one skilled in the art that other and similar processes may be employed which would suggest

We claim:

1. A process for producing fluoboric acid comprising mixing a slight stoichiometric excess of boric acid with a weak fluosilicic acid solution which consists of aqueous fluosilicic acid solution in concentration up to 20%, slowly and at a temperature of at least about 70° C., to produce fluoboric acid in solution with a filterable precipitate of silica and with some fluosilicic and boric acid remaining, and thereafter treating the thereby established solution of fluoboric acid to produce further fluoboric acid by reaction of the fluosilicic and boric acids remaining in said established solution, by concentrating said established solution by evaporation with application of heat, said established solution having a concentration of fluoboric and fluosilicic acids combined of substantially less than 25%, and said evaporation being effected in two stages at successively increasing temperatures, the first stage being carried to a combined acids concentration of 25% to 30% for removing silica by precipitation and the final stage being carried to a combined acids concentration of 45% to 50% for further removal of silicon in volatilized combined form.

2. In a process for producing fluoboric acid the steps of reacting fluosilicic acid and boric acid slowly at a temperature of at least about 70° C. to precipitate silica in filterable form and to establish a solution comprising a major quantity of fluoboric acid, a minor quantity of fluosilicic acid, and boric acid, said established solution having a concentration of fluoboric and fluosilicic acids combined of substantially less than 25%, and thereafter treating the thereby established solution of fluoboric acid to produce further fluoboric acid by reaction of the fluosilicic and boric acids remaining in said established solution, by concentrating said solution by evaporation with application of heat to remove silica by precipitation, said evaporation being continued at elevated temperature for continuing concentration of the solution and removal of silica, until a concentration of fluoboric acid of at least about 45% is reached in the solution and the concentration of fluosilicic acid is reduced to not more than about 1%, said first step of reacting fluosilicic and boric acids being effected by mixing boric acid with a solution which consists of a weak aqueous solution of fluosilicic acid in concentration up to 20%, and said procedure including the step of filtering the solution to remove precipitated silica after the first step of mixing the acids and before the aforesaid evaporation of the solution has continued beyond the point of 30% fluoboric acid concentration.

3. In procedure for producing fluoboric acid from weak fluosilicic acid solutions that consist of aqueous solution of fluosilicic acid in concentrations up to 20%, the steps of mixing boric acid with the fluosilicic acid solution slowly at a temperature of at least about 70% C. to produce a solution containing fluoboric acid and precipitated silica in filterable form and also containing unreacted fluosilicic and boric acids, said established solution having a concentration of fluoboric and fluosilicic acids combined of substantially less than 25%, and thereafter treating the thereby established solution of fluoboric acid to produce further fluoboric acid by reaction of the fluosilicic and boric acids remaining in said established solution, by concentrating said solution by evaporation with application of heat to remove silica by precipitation, until a concentration of fluoboric acid substantially greater than 30% is reached in the solution, said procedure including the step of filtering the solution to remove precipitated silica after the first step of mixing the acids and before said evaporation has continued beyond the point of 30% fluoboric acid concentration, said evaporation with heat being continued, for continuing concentration and removal of silica, until the concentration of fluosilicic acid in the solution is reduced to not more than about 1%, and at least the final part of the evaporation operations being effected after said filtering step.

4. In procedure for producing fluoboric acid from weak fluoboric acid solutions that consist of aqueous solution of fluosilicic acid in concentrations up to 20%, the steps of mixing boric acid with the fluosilicic acid solution slowly at a temperature of at least about 70° C. to produce a solution containing fluoboric acid and precipitated silica in filterable form and also containing unreacted fluosilicic and boric acids, said established solution having a concentration of fluoboric and fluosilicic acids combined of substantially less than 25%, and thereafter treating the thereby established solution of fluoboric acid to produce further fluoboric acid by reaction of the fluosilicic and boric acids remaining in said established solution, by concentrating said solution by evaporation with application of heat to remove silica by precipitation, said evaporation being continued at successively increasing elevated temperatures for continuing concentration of the solution and removal of silica, until a concentration of fluoboric acid of at least about 45% is reached in the solution and the concentration of fluosilicic acid is reduced to not more than about 1%.

5. A process for producing fluoboric acid comprising mixing an approximately ten percent solution of fluosilicic acid, which consists of an aqueous solution of fluosilicic acid, with a slight excess of boric acid over a period of from one to two hours while maintaining a temperature of between about 80° C. and 90° C., to precipitate silica in filterable form and to establish a solution comprising a major quantity of fluoboric acid, a minor quantity of fluosilicic acid, and boric acid, said established solution having a concentration of fluoboric and fluosilicic acids combined of substantially less than 25%, filtering the hot solution to remove precipitated silica, and thereafter treating the thereby established solution of fluoboric acid to produce further fluoboric acid by reaction of the fluosilicic and boric acids remaining in said established solution, by concentrating the solution by evaporation at successively increasing temperatures, including first concentrating the solution to precipitate further silica while maintaining the temperature within a lower range of said last-mentioned temperatures to reduce vapor loss, and thereafter continuing to concentrate the solution, in a higher range of said temperatures, to at least about 45% concentration of fluorine-containing acid which will comprise at least about 99% fluoboric acid and not more than about 1% fluosilicic acid.

References Cited in the file of this patent

UNITED STATES PATENTS 2,692,186    Kamlet    Oct. 19, 1954

FOREIGN PATENTS 15,083    Great Britain    1892
635,551    Great Britain    Apr. 12, 1950

OTHER REFERENCES

"Encyclopedia of Chemical Reactions," by C. A. Jacobson, vol. 1, 1946 ed., page 684. Reinhold Publishing Corp., New York 18, N. Y.

J. W. Mellor's "A Comprehensive Treatise on Inorganic and Theoretical Chemistry," vol. 5, 1924 ed., page 62, Longmans, Green and Co., New York.

Stolba: Zeit. Anal. Chem. 3, pages 312, 313 (1964).

U. S. DEPARTMENT OF COMMERCE
PATENT OFFICE

CERTIFICATE OF CORRECTION

Patent No. 2,799,559            July 16, 1957

Thomas J. Sullivan et al.

It is hereby certified that error appears in the printed specification of the above numbered patent requiring correction and that the said Letters Patent should read as corrected below.

Column 5, line 56, for "70% C." read -- 70° C. --; column 6, line 9, for "fluoboric" read -- fluosilicic --; line 71, for "(1964)" read --(1864)--.

Signed and sealed this 25th day of March 1958.

(SEAL)
Attest:
KARL H. AXLINE                          ROBERT C. WATSON
Attesting Officer                    Commissioner of Patents